US007986073B2

United States Patent
Godil

(10) Patent No.: US 7,986,073 B2
(45) Date of Patent: Jul. 26, 2011

(54) MICRO-ELECTRO MECHANICAL SYSTEM USING SNAPPING TABS, COMB AND PARALLEL PLATE ACTUATION

(75) Inventor: Asif A. Godil, Pleasanton, CA (US)

(73) Assignee: AG Microsystems Inc., Santa Clara, CA (US)

( * ) Notice: Subject to any disclaimer, the term of this patent is extended or adjusted under 35 U.S.C. 154(b) by 0 days.

(21) Appl. No.: 12/927,648

(22) Filed: Nov. 19, 2010

(65) Prior Publication Data

US 2011/0102871 A1 May 5, 2011

Related U.S. Application Data

(63) Continuation of application No. 12/074,027, filed on Mar. 1, 2008, now Pat. No. 7,863,799.

(60) Provisional application No. 60/904,697, filed on Mar. 2, 2007.

(51) Int. Cl.
  *H02N 1/00* (2006.01)
  *G02B 26/08* (2006.01)

(52) U.S. Cl. ......... 310/309; 310/308; 310/310; 359/872
(58) Field of Classification Search ................. 310/315, 310/308, 309; 359/872; *H02N 1/00; G02B 26/08*
See application file for complete search history.

(56) References Cited

U.S. PATENT DOCUMENTS

| | | | | |
|---|---|---|---|---|
| 2005/0017598 A1* | 1/2005 | Zettl et al. | ..................... | 310/309 |
| 2005/0036196 A1* | 2/2005 | Barnea et al. | ................. | 359/291 |
| 2005/0156482 A1* | 7/2005 | Greywall | ....................... | 310/309 |
| 2005/0179338 A1* | 8/2005 | Tamura | ......................... | 310/309 |
| 2005/0269898 A1* | 12/2005 | Miller et al. | .................. | 310/309 |
| 2006/0082250 A1* | 4/2006 | Ko et al. | ....................... | 310/309 |
| 2006/0198012 A1* | 9/2006 | Noh et al. | ..................... | 359/291 |
| 2006/0284514 A1* | 12/2006 | Ko et al. | ....................... | 310/309 |
| 2007/0001542 A1* | 1/2007 | Neidrich | ....................... | 310/309 |

* cited by examiner

Primary Examiner — Quyen Leung
Assistant Examiner — Terrance Kenerly

(57) ABSTRACT

The present invention combines electrostatic comb with parallel plate actuation in a novel design to create a robust low voltage MEMS Micromirror. Other unique advantages of the invention include the ability to close the comb fingers for additional reliability and protection during mirror snapping with over voltage.

22 Claims, 7 Drawing Sheets

MICRO-ELECTRO MECHANICAL SYSTEM USING SNAPPING TABS, COMB AND PARALLEL PLATE ACTUATION

This application makes reference to, claims priority to and claims benefits from U.S. Provisional Application Ser. No. 60/904,697 filed on Mar. 2, 2007, which is incorporated herein by reference in its entirety, and is a continuation of, and also claims priority to and the benefit from U.S. patent application Ser. No. 12/074,027, entitled "Micro Electro Mechanical System Using Comb and Parallel Plate Actuation" and filed on Mar. 1, 2008, which is incorporated herein by reference in its entirety.

TECHNICAL FIELD

The subject of this application generally relates to the field of Micro Electro Mechanical System (MEMS) and more particularly to MEMS with a structure rotating around a torsional hinge.

BACKGROUND

MEMS based actuators are enabling the emergence of a host of new components for use in displays, inertial measurement systems, RF and wireless systems and fiber-optic. In particular, optical components that are more compact, highly reliable, low power consumption and low cost are highly desirable. Examples of such components include switches, variable optical attenuators (VOA), tunable filters, and wavelength blockers.

One particularly important class of MEMS devices for such applications is the MEMS Micromirror rotating around a torsional hinge. In the early work on such devices the actuation was based on parallel plate electrostatic force usually between the mirror and another electrode on one side of the axis. Some variations in this line are discussed by Miller (U.S. Pat. No. 7,010,188) and Nasiri (U.S. Pat. No. 6,533,947). More recent developments in the field include vertical comb drive actuators, which are discussed by Costello (U.S. Pat. Nos. 6,838,738; 6,628,856 and 6,782,153) and Novotny (U.S. Pat. Nos. 6,751,395; 6,914,711 and 6,914,710).

Combs drive actuation exhibit significant advantages over parallel plate actuation in the areas of speed, actuation voltage, and range of motion. Commercial examples include VOA products from Lightconnect (now Neophotonics), Dicon Fiberoptics and Santec.

Notwithstanding these advantages, there are limitations in the approaches of Costello, Novotny and others. Some of the limitations are in the actuation mechanism, the functional design space and the fabrication process of MEMS with a structure rotating around a torsional hinge. For example, the reduction of the amount of force and the throw distance are limited as in the use of fringe field in Costello's approach. In particular, the actuation mechanism of parallel plate force cannot be added. Furthermore, the comb fingers have to be like cantilevers and the fingers structure cannot be mechanically closed. Therefore, the comb fingers cannot be too long as they become susceptible to lateral snap. Similarly, in the case of Novotny, again, parallel plate force cannot be added and the stator combs can only be on one side of the structure. This will affect the air damping on the two sides of the structure axis and lead to higher susceptibility to mechanical shock.

MEMS with a structure rotating around a torsional hinge, such as micromirrors, are often operated close to the snapping point and the design and performance of such devices especially for low voltage and high stability applications is desired. This patent application presents a MEMS that combines both comb actuation with parallel plate force actuation to provide the maximum rotational force or torque and the design of MEMS that allows for snapping between the stator and rotor structures. Furthermore, this patent application presents a MEMS that recovers properly when the applied voltage is eliminated, or reduced below a certain operating voltage threshold thus overcoming many of the limitations of the prior art.

DETAILED DESCRIPTION

In general, Coulomb's law, simply stated, relates the magnitude of the electrostatic force between two point electric charges to be (a) directly proportional to the product of the magnitudes of each charge and (b) inversely proportional to the square of the distance between them. Microactuators utilize electrostatic actuation force, based on Coulomb's law, to overcome the elastic force required to deflect or deform a link that connects a movable structure to a fixed structure. The elastic force of the deformed link provides a restoring force that is needed for the movable structure to return to its initial position, i.e. in the absence of the electrostatic force.

Figure 1:
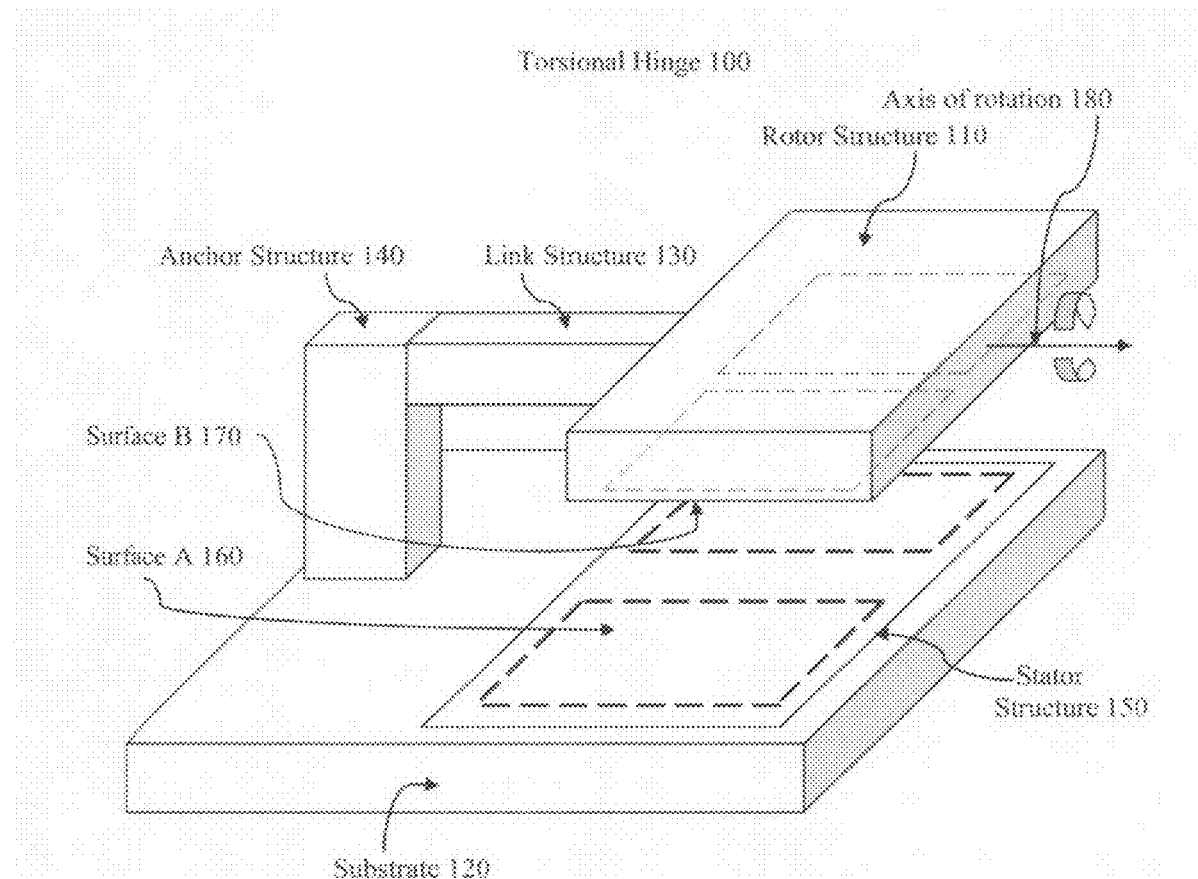
FIG. 1 shows an exemplary MEMS that combines a rotor structure, supported by one torsional hinge, and a stator structure in accordance with one embodiment.

An exemplary torsional hinge 100 mechanically coupling a rotor structure 110 to a substrate 120 is shown in FIG. 1. The torsional hinge 100 is itself composed of two portions. The first portion is a link structure 130 that can deform under twisting or flexing of the rotor structure 110, and is normally used to suspend the rotor structure 110. The second portion is an anchor structure 140 that is rigidly attached to the substrate 120 and the link structure 130, and is used to provide the mechanical support to suspend the rotor structure 110 at a given distance from a stator structure 150. The stator structure 150 comprises an electrically conductive surface area A 160. Similarly, the rotor structure comprises an electrically conductive surface area B 170, where it is relatively aligned to surface A 160. The rotor structure 110 is at rest when there is no electrostatic force being generated between the rotor structure 110 and the stator structure 150. An electrostatic force is generated whenever an electric potential is applied between surface A 160 and surface B 170. When an electric potential is applied between surface A 160 and surface B 170, an electrostatic force is generated and the rotor structure 110 will be tilted toward the stator structure 150 where the generated electrostatic force balances the restoring force that is due to the deformation or the twisting of the link structure 130.

The electrostatic force generated between the electrically conductive surfaces A 160 and B 170 and is often referred to as a parallel plate drive, since often the surfaces A 160 and B 170 are relatively flat and parallel to each other while the rotor structure is at rest. The electrostatic force is produced when an electric potential is applied to the electrically conductive surfaces or plates. Based on Coulomb's law, the resultant electrostatic actuation force is directly proportional to the square of the voltage across the plates and inversely proportional to the square of the plate separation. The electrostatic actuation force is also directly affected by the permittivity of air. Computations of such forces will be shown further below. The movement of the rotor structure 110 is controlled with the appropriate dimensions of the link structure 130 such that the tilting of the rotor structure resembles a rotation around an axis of rotation 180, as is shown in FIG. 1.

Figure 2:
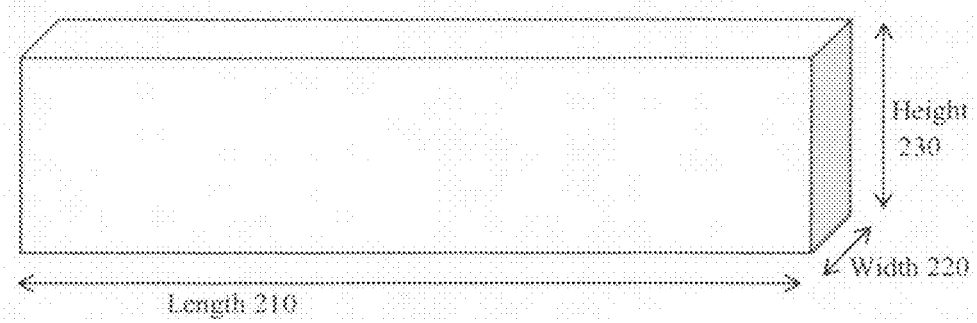
FIG. 2 shows an exemplary link structure in accordance with the embodiment of FIG. 1.

The dimensions of the link structure 200 usually resemble a thin long beam, as shown in FIG. 2. The link structure 200 is designed with its width 220 being shorter than its height 230 and much shorter than its length 210, so that the twisting and deformation of the link structure 200 is easiest along the thinnest dimension, which is the width 220. Therefore, the mechanical reliability of the overall hinge is directly affected by its ability to deform and then return to its original state without being damaged. In addition, please note that the dimensions of the link structure 200 directly control not only the restoring force but also the reliability of the overall MEMS. Link structures with other types of geometrical shapes, e.g. cylindrical, can also be used in place of a rectangular beam structure; and similar design criteria will be employed to appropriately dimension the link structure 130.

Figure 3:
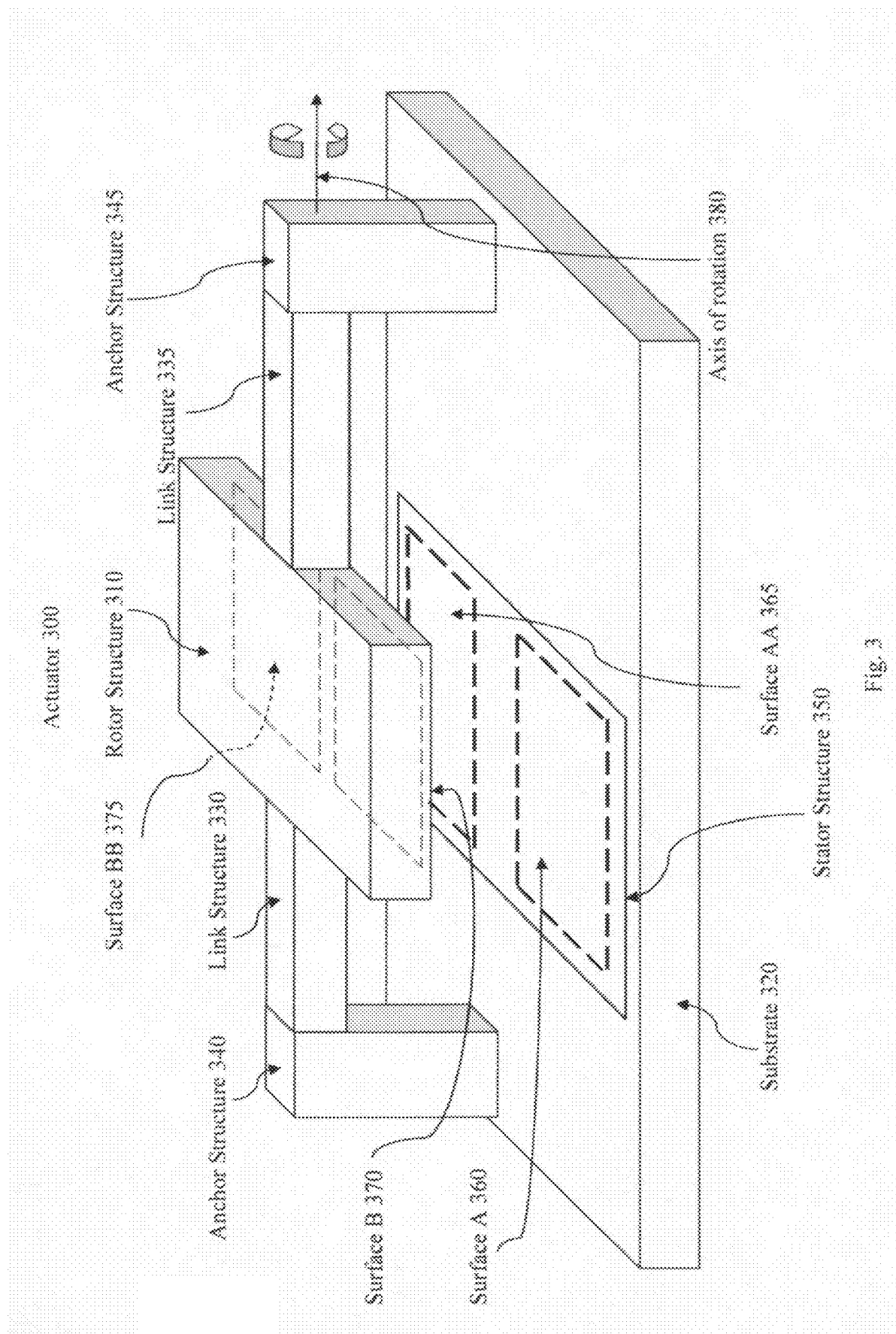
FIG. 3 shows a perspective view of exemplary MEMS that combines a rotor structure, supported by two torsional hinges, and a stator structure in accordance with another embodiment.

An actuator 300 with a rotor structure 310 that is suspended by two torsional hinges is shown in FIG. 3. The first torsional hinge comprises a link structure 330 and an anchor structure 340 and the second torsional hinge comprises a link structure 335 and an anchor structure 345. The rotor structure will rotates in a first direction around the axis of rotation 380 when an electric potential that is applied between surface A 360 and surface B 370 generates an electrostatic force that balances the elastic forces of the combined link structures 330 and 335. The rotor structure will rotates in a second direction, opposite to the first direction, around the axis of rotation 380 when an electric potential that is applied between surface AA 365 and surface BB 375 generates an electrostatic force that balances the elastic forces of the combined link structures 330 and 335.

A snapping of the rotor structure 310 occurs when the applied electrostatic force is large enough to rotate the rotor structure 310 all the way to the stator structure 350 and physical contact of the two structures occurs. This snapping can be catastrophic in multiple ways. One possible catastrophic failure of the MEMS occurs when an electrical short circuit of the two electrically conductive surfaces A 360 and B 370 occurs during the snapping of the rotor structure 310. Electrically insulating the stator structure 350 or the rotor structure 310 can prevent such short circuit when snapping occurs, however at an additional cost. The insulation can be accomplished via the addition of a layer of a dielectric material to insulate the electrically conductive surfaces A 360, AA 365, B 370, and BB 375. However, the dielectric surfaces charge up with applied voltage and cause undesirable effects such as drift and other time-related effects. Another possible catastrophic MEMS failure is referred to as stiction and it occurs when the generated electrostatic force causes the rotor structure 310 to snap and becomes mechanically attached, to the stator structure 350 because of surface charges. If the stiction force is greater than the restoring force of the rotor structure 310, then the rotor structure 310 will not be able to rotate back when the electrostatic force is removed.

Furthermore, the electrically conductive surfaces A 360, AA 365, B 370, and BB 375, shown in FIG. 3 as flat surfaces, can be made up using various shapes and structures. For example, a comb structure formed by a row of long thin fingers that are designed onto surface A 360 and are interdigitated with a row of long thin fingers onto surface B 370. The computation of the resultant electrostatic force generated from such comb structure is different from parallel plate and both are generally derived from Coulomb's law and given by equations 1 and 2 below.

The electrostatic force generated using a parallel plate drive structure:

$$F_{pp} = \varepsilon A \frac{v^2}{2x^2} \quad \text{(Equation 1)}$$

Where the electrostatic force of the parallel plate drive $F_{pp}$ is directly proportional to the permittivity of air ($\varepsilon$), the total surface area of the parallel plate (A), the square of the voltage potential across the plates ($v^2$) and inversely proportional to the square of the plates' separation ($x^2$).

The electrostatic force generated using a comb drive structure:

$$F_{cd} = \varepsilon N l \frac{v^2}{d} \quad \text{(Equation 2)}$$

Where the electrostatic force of the comb drive $F_{cd}$ is directly proportional to the permittivity of air ($\varepsilon$), number of rotor combs (N), the length of the comb drive (l), the square of the voltage potential between the rotor and stator combs ($v^2$) and inversely proportional to the comb drive separation (d).

Figure 4A:
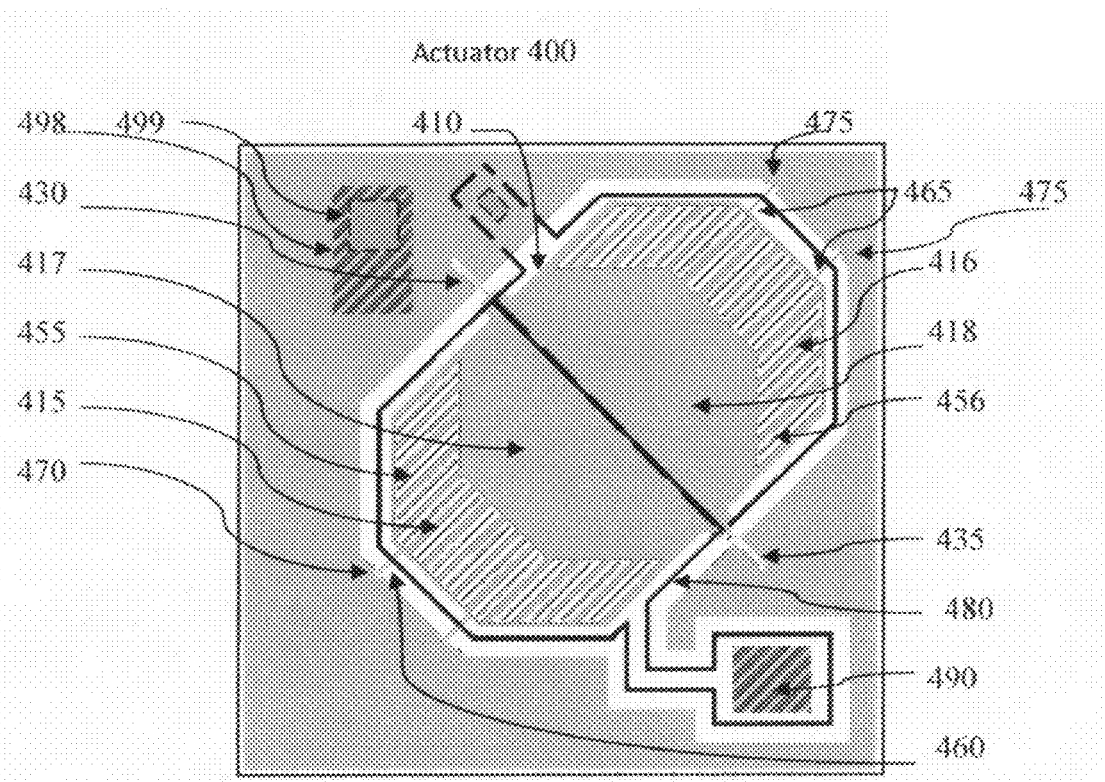
FIG. 4A shows a plan view of an exemplary MEMS actuator that combines a rotor structure, supported by two torsional hinges, and a stator structure in accordance with yet another embodiment.
Figure 4B:
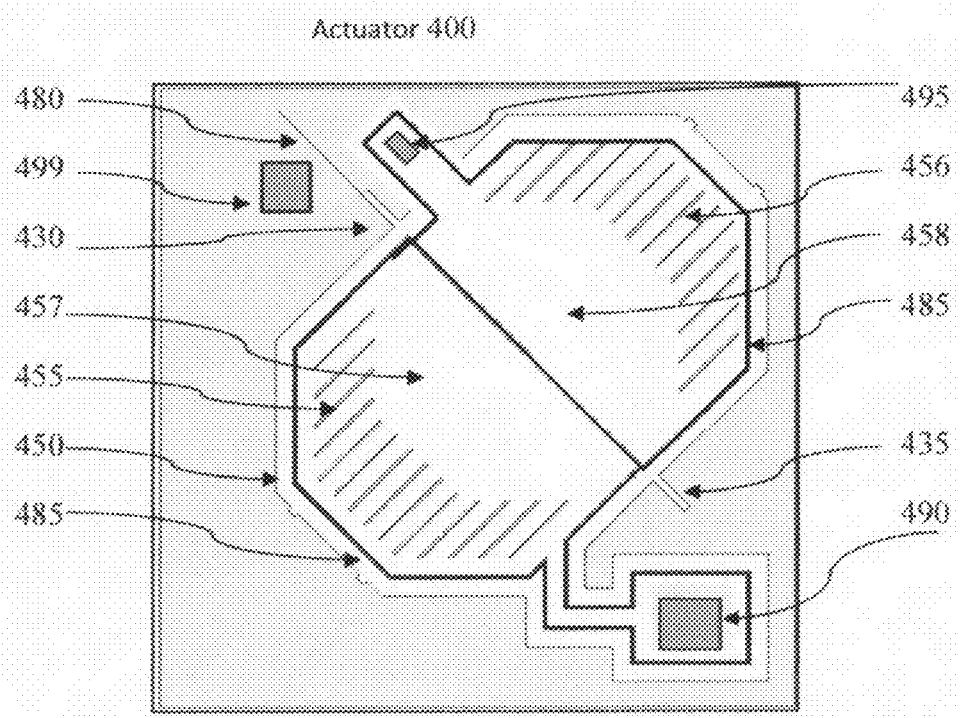
FIG. 4B shows a plan view of the stator structure in accordance with the exemplary MEMS of FIG. 4A.

One embodiment of an actuator 400 comprises an rotor structure 410 that is atop a stator structure 450, supported by a first torsional hinge 430 and a second torsional hinge 435. The actuator 400 is shown using a two-layer approach, one stator layer for the stator structure 450 as shown in FIG. 4B and one for the actuator 400 top view showing the rotor layer and only a portion of the stator layer as shown in FIG. 4A. The rotor structure 410 uses a combination of a comb drive actuation and parallel plate actuation, thus increasing the total electrostatic force being generated and hence the total torque that is applied to the rotor structure 410. The rotor structure 410 comprises a first comb structure 415 and a first plate structure 417 that are relatively aligned with a second comb structure 455 and a second plate structure 457, both of which are formed on the stator structure 450. In addition, the collinear torsional hinges 430 and 435 define an axis of rotation 480, shown in FIG. 4B, wherein the rotor structure 410 rotates in a plane that is orthogonal to the axis of rotation 480. The rotor structure 410 further comprises a third comb structure 416 and a third plate structure 418 that are relatively aligned with a fourth comb structure 456 and a fourth plate structure 458, both of which are formed on the stator structure 450, as shown in FIG. 4A and FIG. 4B. The rotor structure 410 exhibits symmetry and is balanced on either sides of the axis of rotation 480.

The comb structure 415 is formed using a thin long fingers extending out of the parallel plate structure 417 on one side and are fully enclosed by the rotor structure 410 on the other side, thus it is referred to as a closed comb structure. The top view of the stator structure 450 is shown in FIG. 4B. The stator structure 450 is relatively aligned below the rotor structure 410 using the torsional hinges 430 and 435 that are anchored to the stator structure 450. Furthermore, the second comb structure 455 is formed using fingers that extend upward from the stator structure 450 and are interdigitated with the first comb structure 415. Similarly, the fourth comb structure 456 is formed using fingers that extend upward from the stator structure 450 and are interdigitated with the third comb structure 416. All comb structures fingers do not mechanically contact each other as the rotor structure 410 rotates around the rotation axis 480 and subsequently avoiding any lateral snapping between the rotor structure 410 and the stator structure 450 as shown in FIG. 4A. The first comb structure 415 and the second comb structure 455 form a comb drive actuation mechanism for the rotor structure 410. Similarly, the first plate structure 417 and the second plate structure 457 form a parallel plate drive actuation mechanism. The total torque generated by both actuation mechanisms causes the rotor structure 410 to rotate around the axis of rotation 480. The computation of the total torque is discussed in the next paragraph and is simply computed by the addition of the two independently calculated torques, namely the parallel plate drive torque and comb drive torque.

Generally, the torque that is generated by an actuator designed to use both the parallel plate drive and the comb drive can be theoretically computed by adding the two independently calculated torques and is governed by equation 3, as listed below.

$$T = T_{cd} + T_{pp} = \int (F_{cd} + F_{pp}) x \cdot dA = k_T \theta \quad \text{(Equation 3)}$$

$$\theta = T/k_T \quad \text{(Equation 4)}$$

Where T is the total torque, $T_{cd}$ is the torque component from the comb drive actuation, $T_{pp}$ is the torque from the parallel plate actuation. $F_{cd}$ and $F_{pp}$ are the electrostatic forces generated by the comb drive structure and the parallel plate structure respectively and x is the lever arm distance from the axis of rotation as defined by two collinear torsional hinges. The torque T is applied against two torsional hinges that pushback with a restoring torque, $k_T \theta$ where $k_T$ is the torsional stiffness of the two hinges and $\theta$ is the rotational angle of the rotor structure 410. The rotational angle $\theta$ can be controlled by the balance of the total torque T and the torsional stiffness $k_T$, as shown in equation 4 above. In the next few paragraphs, the electrical configuration of the comb drive and parallel plates drive and the resultant rotation of the rotor structure 410 will be discussed.

An isolation trench 485 electrically isolates the stator structure 450 from the second comb structure 455, the second plate structure 457, the fourth comb structure 456 and the fourth plate structure 458, as shown in FIG. 4B. Furthermore, the second comb structure 455 and the second plate structure 457 are electrically coupled to a first bondpad 490. Similarly, the fourth comb structure 456 and the fourth plate structure 458 are electrically coupled to a second bondpad 495 that is electrically isolated from the first bondpad 490 by the isolation trench 485, as shown in FIG. 4B. Both the first and second bondpads are isolated from the rest of the stator structure 450. In addition, the rotor structure 410 is electrically coupled to a rotor structure bondpad 498, and the stator structure 450 is electrically coupled to a stator structure bondpad 499, wherein both bondpads 498 and 499 are electrically coupled and together are referred to as the third bondpad.

Figure 4C:
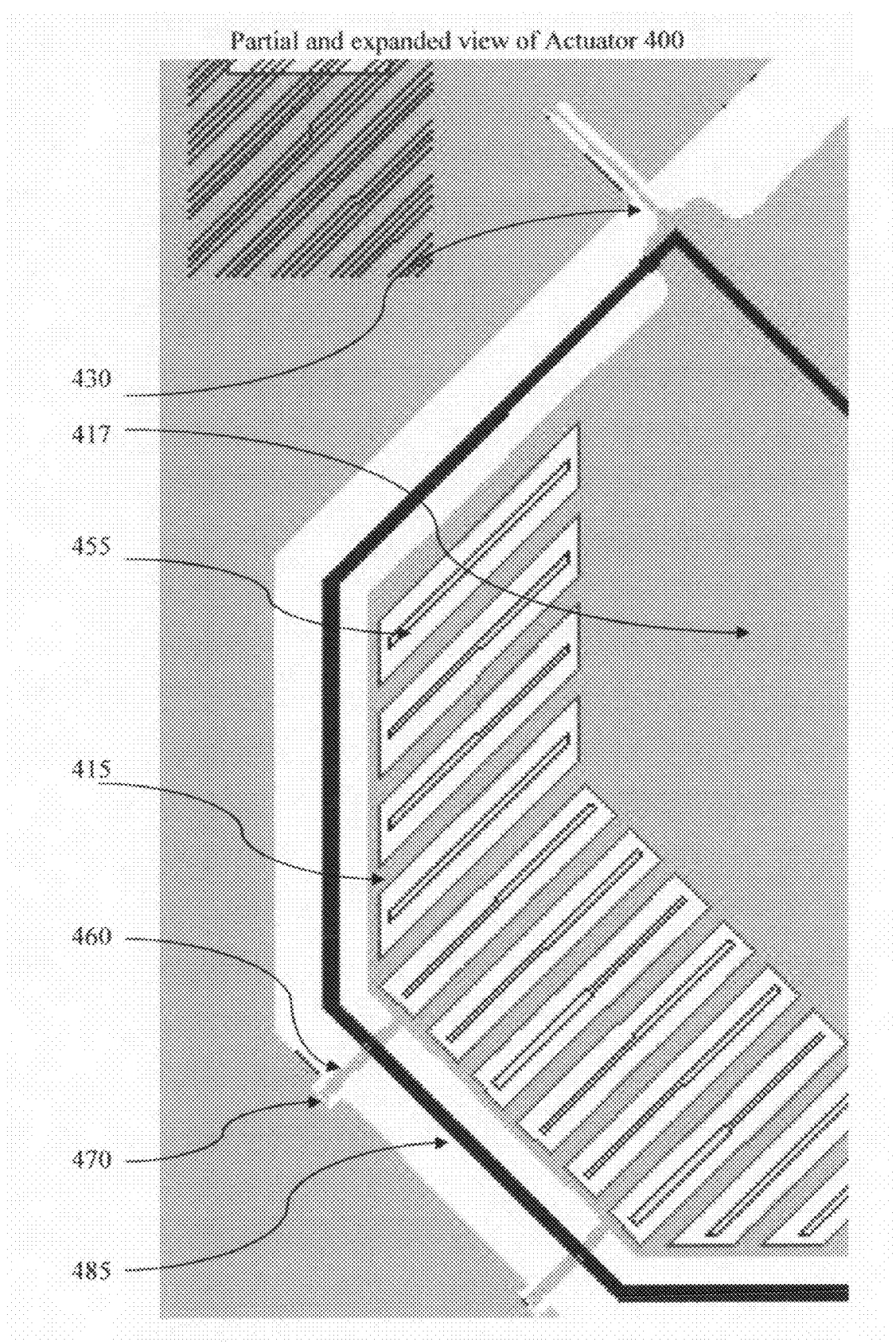
FIG. 4C shows a partial and expanded view of the exemplary MEMS of FIG. 4A.
Figure 4D:
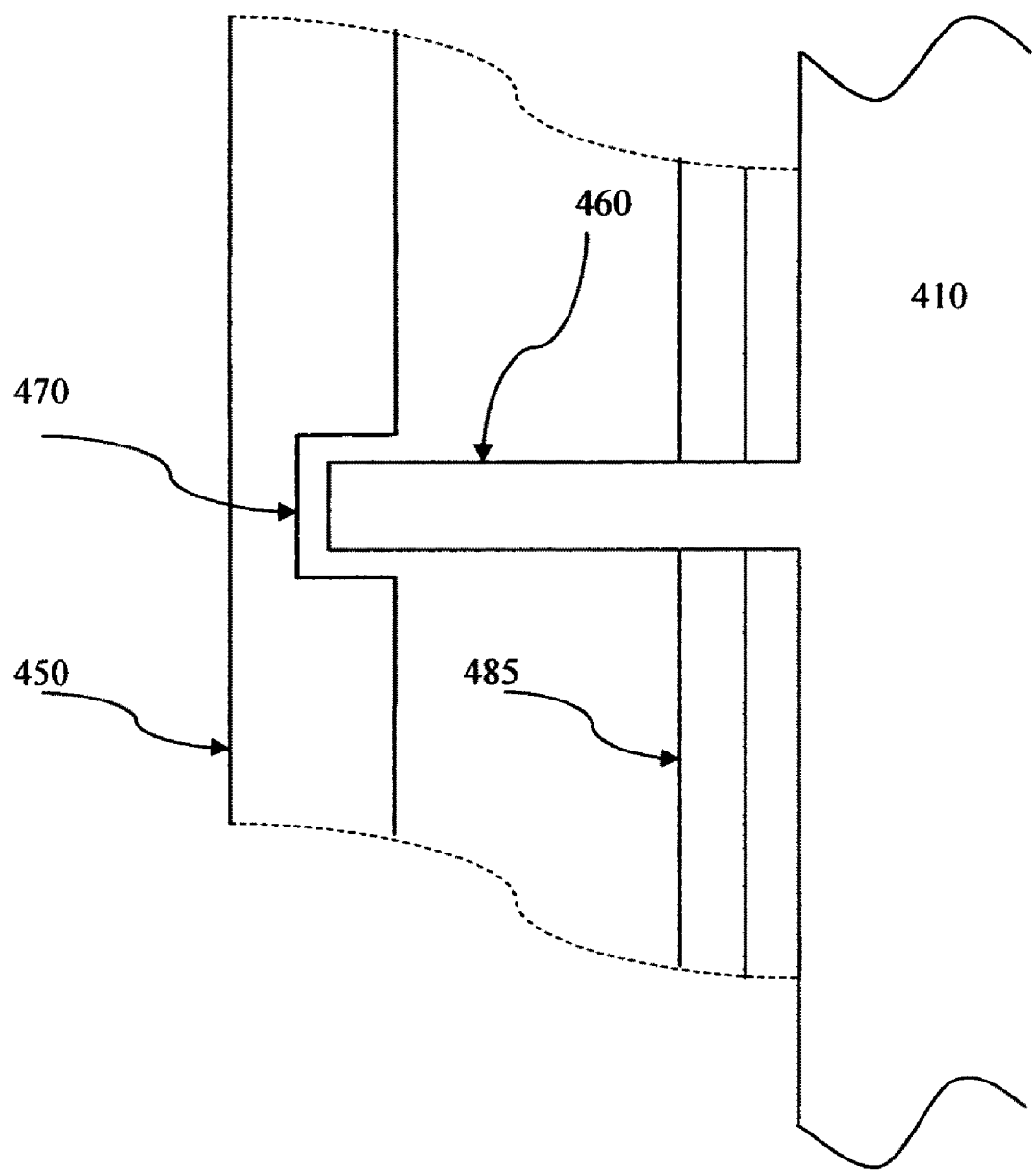
FIG. 4D shows expanded view of the snapping tab and aperture structures for the exemplary MEMS of FIG. 4A.

A partial and expanded view of the actuator 400 is shown in FIG. 4C, where the isolation trench 485, the first comb structure 415, the second comb structure 455, a snapping tab 460 and a snapping tab aperture 470 are shown. The snapping tab 460, which extends out of the rotor structure 410, is electrically coupled to the third bondpad through the rotor structure 410. The snapping tab aperture 470 is shaped as a narrow opening in the stator structure 450 and is electrically coupled to the third bondpad. The snapping tab aperture 470 is dimensioned slightly larger than the snapping tab 460 such as to limit the lateral movement of the rotor structure 410 as it rotates around the axis of rotation 480. An expanded view of the snapping tab 460 and snapping tab aperture 470 is shown in FIG. 4D. According to a preferred embodiment, the rotor structure comprises two snapping tabs 460 on one side of the rotor structure 410 and another two snapping tabs 465 on the opposite side of the rotor structure 410, as shown in FIG. 4A. The snapping tabs 460 and 465 comprise electrically conductive surfaces and are electrically coupled to the rotor structure 410. In addition, when snapping occurs, the snapping tabs apertures 470 and 475 guide the snapping tabs 460 and 465 to make mechanical and electrical contact with the stator structure 450. Therefore, two major benefits are derived, the first is avoiding catastrophic failures due to electrical short circuit since both the snapping tabs apertures 470 and 475 and the snapping tabs 460 and 465 are at the same electrical potential, namely the third bondpad potential. The second major benefit is reducing to a great extent the stiction forces since the snapping tabs 460 and 465 have very small surface area that can make mechanical contact at the corresponding snapping tab apertures 470 and 475, thus the ability for the rotor structure 410 to quickly recover when snapping occurs. Further benefits are also achieved, for example, the likelihood that a lateral snapping can occur between the comb drive structures 415, 455, 416 and 456 is greatly reduced because the snapping tabs apertures 470 and 475 limit the lateral movement of the rotor structure 410 and thus avoiding a possibility for catastrophic failure. Therefore, the actuator 400 possesses an enhanced operational stability and reliability. Next, we will discuss the rotation of Rotor structure 410 due to the application of electrical potential to the comb drive and parallel plate drive.

Figure 4E:
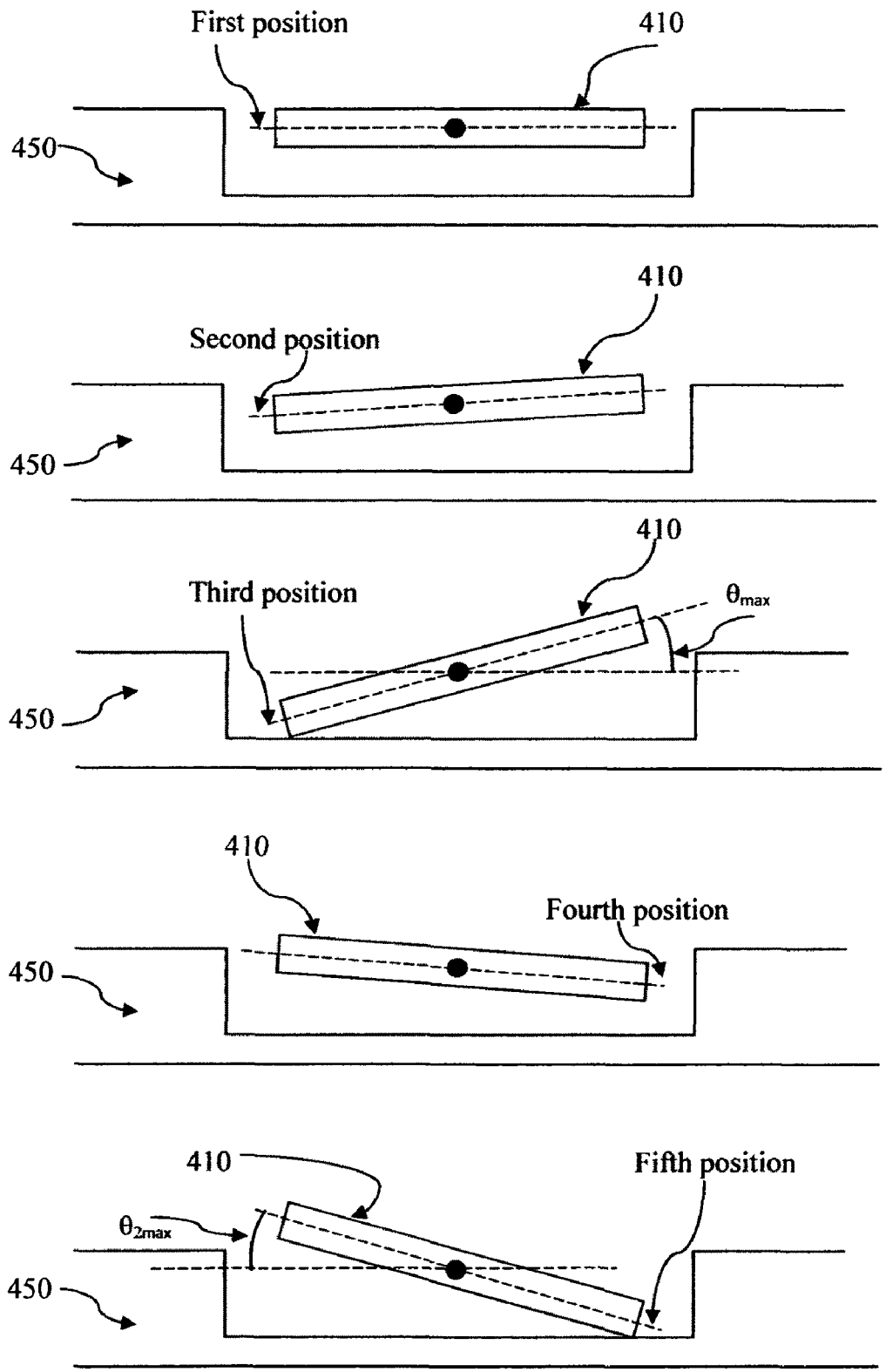
FIG. 4E shows exemplary rotational positions for the exemplary MEMS of FIG. 4A.

Exemplary rotational positions of the actuator 400 according to one embodiment are presented in FIG. 4E. In the absence of any electrical potential between the first and third bondpads or between the second and third bondpads, the rotor structure 410 is normally at rest, namely at a first position, suspended over the stator structure 450 by the torsional hinges 430 and 435. Let us start by applying a first electrical potential between the first and third bondpads. The comb drive formed by the first and second comb structures 415 and 455 and the parallel plate drive formed by the first and second plate structures 417 and 457 will generate an electrostatic force and in turn a torque T. If the first electrical potential is sufficient to generate a torque $T_1$ that is greater than the torsional stiffness $k_T$ of the torsional hinges 430 and 435, then the rotor structure will rotate from a first position to a second position, as shown in FIG. 4E, until $T_1$ balances the torsional stiffness $k_T$ at the second position. Furthermore, a snapping of the rotor structure 410 occurs when a second relatively large electrical potential, is applied between the first and third bond pads, generates a large torque $T_{max}$ that is greater than the torsional stiffness $k_T$ exerted by the torsional hinges. The large torque $T_{max}$ rotates the rotor structure 410 to a maximum rotational angle $\theta_{max}$, whereat the rotor structure 410 mechanically contact the stator structure 450 at a third position, as shown in FIG. 4E.

Similarly, applying a third electrical potential between the second and third bondpads will generate an electrostatic force in the comb drive formed by the third and fourth comb structures 416 and 456 and the parallel plate drive formed by the third and fourth plate structures 418 and 458 and in turn a torque $T_2$. If the third electrical potential is sufficient to generate a torque $T_2$ that is greater than the torsional stiffness $k_T$ of the torsional hinges 430 and 435, then the rotor structure will rotate from the first position to a fourth position, as shown in FIG. 4E, until $T_2$ balances the torsional stiffness $k_T$ at the fourth position. Furthermore, a snapping of the rotor structure 410 occurs when a fourth relatively large electrical potential is applied between the second and third bond pads and thus generates a large torque $T_{2max}$ that is greater than the torsional stiffness $k_T$ exerted by the torsional hinges. The large torque $T_{2max}$ rotates the rotor structure 410 to a maximum rotational angle $\theta_{2max}$ whereat the rotor structure 410 mechanically contact the stator structure 450 at a fifth position, as shown in FIG. 4E. It is important to note that at either the third or the fifth positions the snapping tabs 460 and 465 will be the first to contact the stator structure 450 mechanically and electrically at the snapping tab apertures 470 and 475. Furthermore, because both the rotor structure 410 and the snapping tab aperture 470 are both coupled to the third bondpad, then they are at the same electrical potential and there is no likelihood that a short circuit will occur when electrical contact is made between the rotor structure 410 and the stator structure 450. Therefore, according to this embodiment the snapping of the rotor structure 410 is not catastrophic and can easily recover by reducing or eliminating the applied electrical potential. This is not the case for many MEMS devices where snapping creates a catastrophic damage. Furthermore, many MEMS devices with dielectric surfaces, between their rotor and stator structures to avoid short circuit, charged up and that causes their rotor structure to recover slowly as well. Hence, the stability and reliability of the actuator 400 is further increased. Next, we will discuss exemplary manufacturing steps for a MEMS actuator, where the rotor structure is used as a mirror that can reflect incoming light at different angles in accordance with another embodiment. Yet in another embodiment, the rotor structure can be made to support other types of structure, for example, used to send and receive radio waves.

Figure 5:
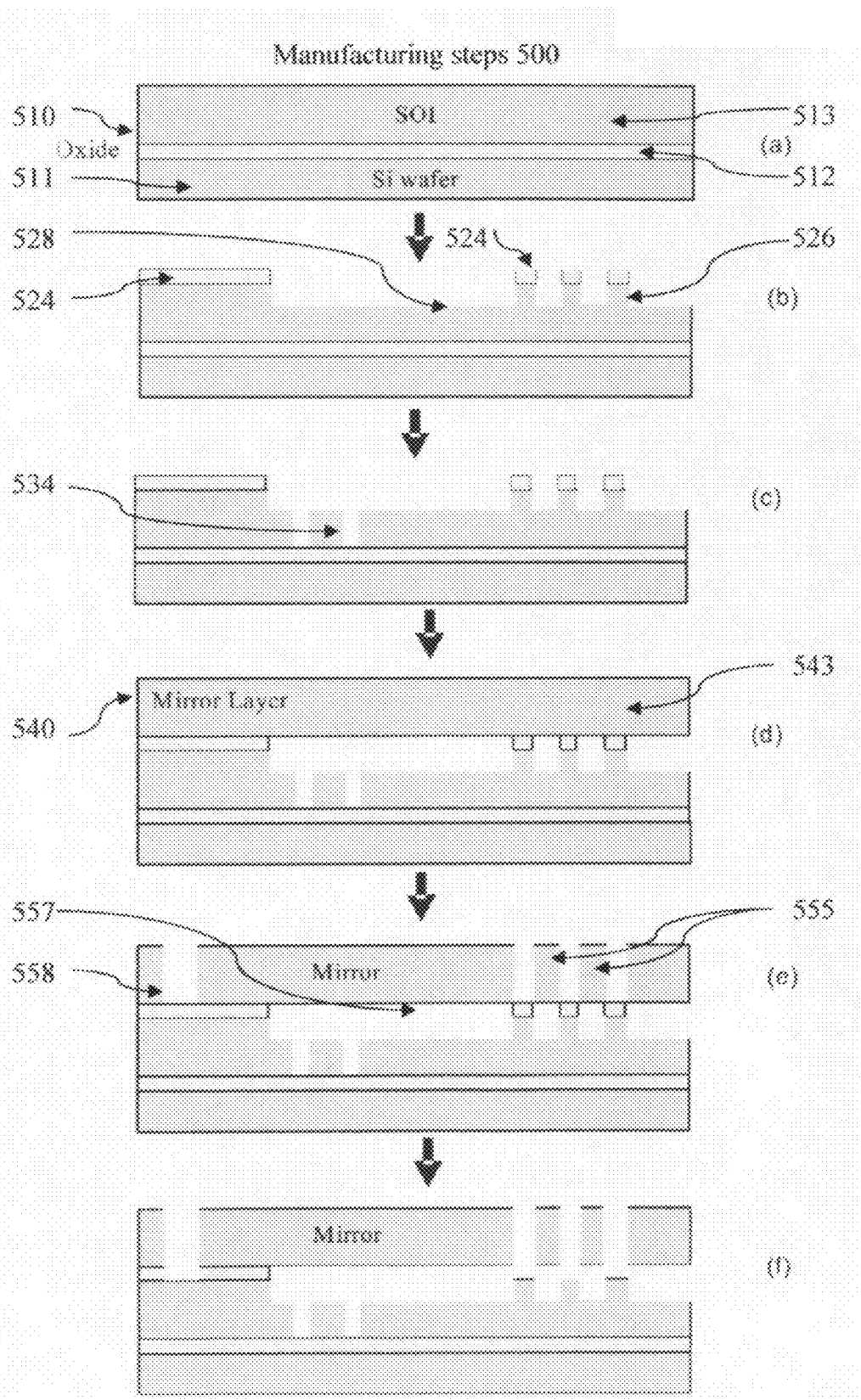
FIG. 5 shows exemplary manufacturing steps for the exemplary MEMS of FIG. 4A

Exemplary manufacturing steps 500 are presented using the cross-sectional views of FIGS. 5a-5f and are accomplished with a straightforward fabrication process. We start with a first SOI wafer 510, shown in FIG. 5a, with a silicon handle 511, buried oxide 512 and SOI layer 513. The buried oxide is typically 0.5-1.0 um thick and the SOI layer is typically 10-30 um. A thermal oxide 524 is grown and the wafer is patterned with a "Cavity" mask that is then etched first with an oxide etcher followed by a silicon deep reactive ion etcher (DRIE), such as the STS silicon etcher, a cross-sectional view is shown in FIG. 5b and the plan view is shown in FIG. 4B. The etching step opens up a cavity in which a micromirror will rotate and at the same time defines the stator combs 526. The width of the stator combs 526 is typically a few microns and there are 10 s to low 100 s that provide the comb drive actuation force to the micromirror. The etching step goes through half to two thirds the depth of the SOI layer 513. The remaining SOI is used to define the stator plate 528 that provides the parallel plate actuation force to the micromirror. In the next step, the Electrode Trench 534 that will electrically separates the stator combs 526 and stator plate 528 from the rest of the SOI layer 513 is defined. The SOI layer 513 is normally connected to ground. A thick photo resist covers the stator combs 526 which is then patterned with the Electrode Trench 534 mask. Again, the STS silicon etcher is used to etch the silicon down to the buried oxide 512, as shown in FIG. 5c and the corresponding trench 485 as shown in FIG. 4B. This electrode trench 534 electrically isolates the stator combs 526 drive and the plate drive 528 from the ground.

In the next step, a second SOI wafer 540 is bonded to the first SOI wafer 510 at the thermal oxide 524 interface, and its handle is removed by grind and polish followed by chemical etching thus defining a micromirror layer 543, as shown in FIG. 5d. Further processing steps of the micromirror layer will define a closed rotor combs 555, rotor plate 557 and bondpad structures 558, as shown FIGS. 5d and 5e. In the following step, the rotor combs 555 are defined and etched, as shown in FIG. 5e, thus exposing the thermal oxide 524 layer atop the stator combs 526 and the bondpad 558. The alignment requirement on lithography for this step is very stringent because the rotor and stator comb alignment is very critical for proper function. This can be accomplished by a good back to front alignment scheme or by opening up windows in the micromirror layer 543 to alignment marks in the SOI layer 513. The micromirror layer 543 alignment marks are then aligned to the SOI layer 513 marks. After lithography, the STS silicon etcher etches the micromirror and rotor combs.

The next processing step is an oxide etcher to remove the thermal oxide 524 from the top of the stator combs 526 and the bondpad 558, as shown in FIG. 5f. The bondpad structure 558 corresponds to the stator structure bondpad 499, as shown in FIG. 4A and FIG. 4B. Finally the photoresist is removed in a plasma asher and then a bondpad metal is deposited through a shadow mask and is nominally Aluminum or Gold with some adhesion layer such as Ti or Cr. The bondpad metal is alloyed at an elevated temperature (350-400 C) to activate the ohmic contact. This is followed by depositing the micromirror metal through another shadow mask onto the octagonal shaped silicon micromirror. For IR (infrared) application in the Telecom wavelength, this is usually a thin layer of Gold with an adhesion layer of Ti. This completes the fabrication of the wafer. Various industry standard methods are available to dice the wafer and create individual chips.

According to one embodiment, the approach allows for closing of the comb fingers as shown in FIG. 4A and FIG. 4C. This leads to a more robust design. Another unique feature is the snapping tabs 460 and 465, and the corresponding aperture 470 and 475, as shown in FIG. 4A. When the micromirror snaps because of over voltage in the vertical or the transverse direction, the snapping tabs 460 and 465, hit the bottom or side of snapping tabs aperture 470 and 475. Both of the snapping tabs 460 and 465 and snapping tabs apertures 470 and 475 are at the same ground potential. In addition, the snapping tabs 460 and 465 provide the micromirror with limited contact area and thus enhancing its performance and reliability.

The bondpad 558 metal contact allows the electrical ground connection to the SOI layer 513 that is defined outside the Electrode Trench 534, as shown in FIG. 5e, including the snapping tabs apertures 470 and 475 and thus grounds the bottom SOI layer 513 (cavity layer) everywhere except the drive region, i.e. the combs 526 and plate 528 regions. The bondpad 558 corresponds to the bondpad 499 as shown in the plan view of FIG. 4A and FIG. 4B. The bondpad 498, shown in FIG. 4A, electrically grounds the micromirror, rotor combs and the rest of the micromirror layer including the snapping tabs 460 and 465. The drive bondpad 490, as shown in FIG.

4B carries a positive voltage to the stator combs 526 and the plate region 528. Since the micromirror plate 557 and the rotor combs 555 are grounded, then a corresponding, electrostatic force is created and in turn, torque is generated that cause the micromirror to rotate.

A Micro Electro Mechanical System (MEMS) actuator operation and manufacturing are described to enable the use in applications where a micro movement of the rotor structure corresponds to a desired operation. The rotor structure can be made for optical or radio frequency applications, e.g. the actuator can be made to act as a mirror to reflect light at different angles thus can be used in optical applications. Furthermore, it can be used as directional antenna where the micro movement of the antenna can be made to optimize reception or emission of radio frequency. Snapping tabs and snapping tabs apertures structures are described to greatly enhance performance, stability and reliability of MEMS actuator. Application utilizing some of the described techniques can avoid MEMS device catastrophic failures and improve overall system performance. In addition, actuator quick recovery and simple manufacturing steps by avoiding the dielectric layer between stator and rotor structure allows cost reduction with increase in performance.

I claim:

1. A micro electro mechanical system, comprising:
   a stator structure comprising a first electrically conductive surface area that is electrically coupled to a first bondpad;
   a rotor structure comprising:
      a second electrically conductive surface area that is electrically coupled to a second bondpad and is part of a first side of the rotor structure,
      a first torsional hinge extending out of a second side of the rotor structure and is mechanically coupled to the stator structure,
      a second torsional hinge extending out of a third side, which is opposite the second side, of the rotor structure and is mechanically coupled to the stator structure, wherein the first and second torsional hinges are collinear and define an axis of rotation around which the rotor structure rotates, and
      a first snapping tab extending out of a fourth side of the rotor structure comprising a third electrically conductive surface area that is electrically coupled to the second bondpad; and
   a first aperture comprising a fourth electrically conductive surface area that is electrically coupled to the second bondpad, wherein the third electrically conductive surface area of the first snapping tab makes both an electrical and a mechanical contact with the fourth electrically conductive surface area of the first aperture when the rotor structure rotates from a first position to a second position due to a first electrostatic force that is produced between the first and second electrically conductive surface areas using a first voltage potential that is applied between the first and second bondpads.

2. The micro electro mechanical system of claim 1, wherein the first and second torsional hinges produce a mechanical force that resists the rotation of the rotor structure.

3. The micro electro mechanical system of claim 1, wherein the first torsional hinge comprises a fifth electrically conductive surface area that is electrically coupled to the second bondpad.

4. The micro electro mechanical system of claim 1, wherein the second torsional hinge comprises a sixth electrically conductive surface area that is electrically coupled to the second bondpad.

5. The micro electro mechanical system of claim 1, wherein the first aperture mechanically restricts both the rotation of the rotor structure to essentially the second position and the lateral displacement of the rotor structure in a plane that is substantially orthogonal to a rotational plane, and the rotational plane is substantially orthogonal to the axis of rotation.

6. The micro electro mechanical system of claim 2, wherein the first and second torsional hinges provides a restoring mechanical force that rotates the rotor structure back to the first position whenever the first voltage potential, which is applied between the first and second bondpads, is less than a second voltage potential.

7. The micro electro mechanical system of claim 1, wherein the rotor structure further comprising:
   a light reflective surface that is formed on a fifth side, which is opposite the first side, of the rotor structure.

8. The micro electro mechanical system of claim 1, wherein the rotor structure further comprising:
   a metallic surface that is formed on a fifth side, which is opposite the first side, of the rotor structure, wherein the metallic surface is an electromagnetic signal transducer.

9. The micro electro mechanical system of claim 1, wherein the second electrically conductive surface area comprises a first planar and a first comb structure.

10. The micro electro mechanical system of claim 9, wherein the first electrically conductive surface area comprises a second planar structure, which is substantially parallel to the first planar structure, and a second comb structure which is dimensioned according to the first comb structure to avoid mechanical contact with the first comb structure when the rotor structure rotates.

11. The micro electro mechanical system of claim 9, wherein the first comb structure is a closed comb structure.

12. The micro electro mechanical system of claim 1, wherein at least one of the stator structure and the rotor structure is formed using a silicon on insulator wafer.

13. The micro electro mechanical system of claim 12, wherein both the first torsional hinge and the second torsional hinge are rigidly attached to at least one of the stator structure and the silicon on insulator wafer.

14. A micro electro mechanical system, comprising:
   a stator structure comprising a first electrically conductive surface area that is electrically coupled to a first bondpad;
   a rotor structure comprising:
      a second electrically conductive surface area that is electrically coupled to a second bondpad and is part of a first side of the rotor structure,
      a first torsional hinge extending out of a second side of the rotor structure and is mechanically coupled to the stator structure, wherein the first torsional hinge defines an axis of rotation around which the rotor structure rotates, and
      a first snapping tab extending out of a third side of the rotor structure comprising a third electrically conductive surface area that is electrically coupled to the second bondpad; and
   a first aperture comprising a fourth electrically conductive surface area that is electrically coupled to the second bondpad, wherein the third electrically conductive surface area of the first snapping tab makes both an electrical and a mechanical contact with the fourth electrically conductive surface area of the first aperture when the rotor structure rotates from a first position to a second position due to a first electrostatic force that is produced between the first and second electrically conductive surface areas using a first voltage potential that is applied between the first and second bondpads.

15. A method comprising:
forming a stator structure comprising a first electrically conductive surface area that is electrically coupled to a first bondpad;
forming a rotor structure comprising:
forming a second electrically conductive surface area that is part of a first side of the rotor structure, wherein the second electrically conductive surface area is electrically coupled to a second bondpad,
forming a first torsional hinge extending out of a second side of the rotor structure, wherein the first torsional hinge is mechanically coupled to the stator structure,
forming a second torsional hinge extending out of a third side of the rotor structure, wherein:
  (i) the third side of the rotor structure is opposite the second side of the rotor structure,
  (ii) the second torsional hinge is mechanically coupled to the stator structure, and
  (iii) the first and second torsional hinges are collinear and define an axis of rotation around which the rotor structure rotates, and
forming a first snapping tab extending out of a fourth side of the rotor structure, wherein the first snapping tab comprises a third electrically conductive surface area that is electrically coupled to the second bondpad;
forming a first aperture comprising a fourth electrically conductive surface area that is electrically coupled to the second bondpad; and
generating a first electrostatic force between the first and second electrically conductive surface areas using a first voltage potential applied between the first and second bondpads, wherein the third electrically conductive surface area of the first snapping tab makes both an electrical and a mechanical contact with the fourth electrically conductive surface area of the first aperture when the rotor structure rotates from a first position to a second position due to the first electrostatic force.

16. The method of claim 15, further comprising:
generating a mechanical force that resists the rotation of the rotor structure using the first and second torsional hinges.

17. The method of claim 15, wherein the first torsional hinge comprises a fifth electrically conductive surface area that is electrically coupled to the second bondpad.

18. The method of claim 15, wherein the second torsional hinge comprises a sixth electrically conductive surface area that is electrically coupled to the second bondpad.

19. The method of claim 15, wherein the first aperture mechanically restricts both the rotation of the rotor structure to essentially the second position and the lateral displacement of the rotor structure in a plane that is substantially orthogonal to a rotational plane, and the rotational plane is substantially orthogonal to the axis of rotation.

20. The method of claim 15, further comprising:
generating a restoring torque that rotates the rotor structure back to the first position whenever the first voltage potential is less than a second voltage potential, wherein the restoring torque is proportional to the torsional stiffness of the first and second torsional hinges.

21. The method of claim 15, further comprising:
forming a light reflective surface area on a fifth side of the rotor structure, wherein the fifth side of the rotor structure is opposite the first side of the rotor structure.

22. The method of claim 15, further comprising:
forming a metallic surface area on a fifth side, which is opposite the first side, of the rotor structure, wherein the metallic surface area is an electromagnetic signal transducer.

* * * * *